(12) United States Patent
Fuchigami et al.

(10) Patent No.: US 11,803,705 B2
(45) Date of Patent: Oct. 31, 2023

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventors: Makoto Fuchigami, Kanagawa (JP); Yasuaki Miyazawa, Kanagawa (JP); Mari Horie, Kanagawa (JP); Hiroshi Murano, Kanagawa (JP); Nobukazu Takahashi, Kanagawa (JP); Kimihiro Wakabayashi, Kanagawa (JP); Masaki Suda, Kanagawa (JP); Eiji Ooyama, Kanagawa (JP); Hiroaki Murai, Kanagawa (JP); Masahiro Ishino, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 341 days.

(21) Appl. No.: 17/113,807

(22) Filed: Dec. 7, 2020

(65) Prior Publication Data

US 2021/0319175 A1 Oct. 14, 2021

(30) Foreign Application Priority Data

Apr. 10, 2020 (JP) .................. 2020-071314

(51) Int. Cl.
  *G06F 40/242* (2020.01)
  *G06F 40/279* (2020.01)
  *G06F 40/205* (2020.01)
(52) U.S. Cl.
  CPC .......... *G06F 40/242* (2020.01); *G06F 40/205* (2020.01); *G06F 40/279* (2020.01)

(58) Field of Classification Search
  CPC .... G06F 40/242; G06F 40/205; G06F 40/279; G06F 16/35; G06F 40/237
  See application file for complete search history.

(56) References Cited

U.S. PATENT DOCUMENTS 10,437,657 B2   10/2019  Wakabayashi et al.
10,452,981 B1*  10/2019  Christie, IV ........... G06N 20/00
(Continued)

FOREIGN PATENT DOCUMENTS

JP   2018-132882 A   8/2018

*Primary Examiner* — Daniel C Washburn
*Assistant Examiner* — Athar N Pasha
(74) *Attorney, Agent, or Firm* — Oliff PLC (57) ABSTRACT

An information processing apparatus includes a memory and processor. The memory stores a trouble category into which a trouble occurring in a product is classified and a design-element category into which a design element causing the trouble and included in the product is classified in mutual association and store a design-element category into which a design element included in a product is classified and a design-requirement category into which a design requirement of the design element is classified in association with each other. The processor receives designation of a first design-element category by user, determines a design-requirement category corresponding to the received first design-element category by referencing to the memory, determines a second design-element category corresponding to the determined design-requirement category and different from the first design-element category, determine a trouble category associated with the determined second design-element category, and notify the user of information indicating the determined trouble category.

9 Claims, 9 Drawing Sheets

| REPORT ID | DATE AND TIME | PRODUCT ID | USER ID | REPORT DATA |
|---|---|---|---|---|
| D11 | ... | P21 | U01 | ... |
| D12 | ... | P22 | U02 | ... |
| D13 | ... | P23 | U03 | ... |
| ... | ... | ... | ... | ... |

121

(56) References Cited

U.S. PATENT DOCUMENTS

| | | | |
|---|---|---|---|
| 2014/0281944 A1* | 9/2014 | Winer | G06F 40/274 |
| | | | 715/259 |
| 2017/0004184 A1* | 1/2017 | Jain | G06F 16/35 |
| 2018/0048673 A1* | 2/2018 | Hunt | H04L 63/1425 |
| 2018/0232271 A1* | 8/2018 | Wakabayashi | G06K 9/6267 |
| 2019/0148012 A1* | 5/2019 | Conlin | G16H 10/40 |
| | | | 705/2 |
| 2019/0327161 A1* | 10/2019 | Cannell | H04L 43/0817 |
| 2020/0380400 A1* | 12/2020 | Akarapu | G06F 16/90335 |
| 2021/0335499 A1* | 10/2021 | Simpson | G16H 40/67 |

* cited by examiner

| REPORT ID | DATE AND TIME | PRODUCT ID | USER ID | REPORT DATA |
|---|---|---|---|---|
| D11 | ... | P21 | U01 | ... |
| D12 | ... | P22 | U02 | ... |
| D13 | ... | P23 | U03 | ... |
| ... | ... | ... | ... | ... |

TROUBLE REPORT

· TROUBLE NAME: INJURY TO OPERATOR'S FINGER

· OCCURRENCE DATE AND TIME: APRIL 1, 2020, AT 14:15

· OCCURRENCE LOCATION: Q COMPANY

· PRODUCT: IMAGE FORMING APPARATUS (...)

· RELATED PARTS: COVER, DEVELOPING UNIT, ...

· CAUSE: THE OPERATOR OPENED THE COVER TO CHECK THE DEVELOPING UNIT AND THEN CLOSED THE COVER. THE OPERATOR PLACED THEIR FINGER BETWEEN THE COVER AND THE DEVELOPING UNIT WHEN CLOSING THE COVER, SO <u>THE FINGER WAS CAUGHT</u> IN THE COVER AND INJURED.

FIG. 5

| STANDARD TERM | SYNONYM |
|---|---|
| OPERATOR | ... USER, MANIPULATOR, ... |
| ABNORMAL SOUND | ... NOISE, UNDESIRED SOUND, RATTLING, ... |
| FINGER IS CAUGHT | ... FINGER PINCHING, JAMMED FINGER, FINGER IS TRAPPED, ... |
| INJURY | ... HARM, GET HURT, ... |
| BECOME LOOSE | ... SLACKEN, COME OFF, STRETCH, ... |
| ... | ... |

FIG. 6

| REPORT ID | DESIGN-ELEMENT CATEGORY | FAILURE-STATUS WORD/PHRASE (FAILURE MODE) | TROUBLE CATEGORY |
|---|---|---|---|
| ... | ... | ... | ... |
| D11 | COVER | OPERATOR GETS THEIR FINGER CAUGHT IN COVER WHEN OPENING OR CLOSING COVER | OPERATOR INJURY |
| ... | ... | ... | ... |
| D12 | CABLE/PULLEY | CABLE BECOMES LOOSE | OCCURRENCE OF SMOKE DUE TO CONTACT BETWEEN DESIGN ELEMENT AND INTERNAL MECHANISM |
| ... | ... | ... | ... |
| D13 | BAFFLE | WEAR OF ROLLER | SEPARATION FAILURE |
| ... | ... | ... | ... |

| DESIGN-ELEMENT CATEGORY | DESIGN-REQUIREMENT CATEGORY | FAILURE-STATUS WORD/PHRASE (FAILURE MODE) |
|---|---|---|
| GEAR | TRANSMIT DRIVING FORCE | WORN |
| | | BROKEN |
| FUSE | PROTECT CIRCUIT FROM OVERCURRENT | NOT BLOWN BY EXPECTED OVERCURRENT |
| CONNECTOR | ENABLE ELECTRICAL CONNECTION | CONNECTION PIN IS DEFORMED |
| HARNESS | TRANSMIT ELECTRICAL POWER | BROKEN |
| COVER | PROTECT INTERIOR OF MECHANISM | CRACK, DEFORMATION |
| | BE CAPABLE OF BEING OPENED AND CLOSED BY OPERATOR | OPERATOR GETS THEIR FINGER CAUGHT IN COVER WHEN OPENING OR CLOSING COVER |
| BAFFLE | SEPARATE SHEET FROM ROLLER | TIP ABRASION |
| | | POSITION FAILURE |
| | BE CAPABLE OF BEING OPENED AND CLOSED BY OPERATOR | OPERATOR GETS THEIR FINGER CAUGHT IN COVER WHEN OPENING OR CLOSING COVER |
| CABLE/PULLEY | DRIVE MECHANISM | WORN |
| | NOT BECOME LOOSE OR COME OFF | CABLE BECOMES LOOSE |
| CHAIN | DRIVE MECHANISM | RUNNING OUT OF OIL |
| | NOT BECOME LOOSE OR COME OFF | CHAIN COMES OFF |
| PTC THERMISTOR | PROTECT CIRCUIT FROM OVERCURRENT | DECREASE IN FIRE RESISTANCE DUE TO DETERIORATION |
| FINGER | SEPARATE SHEET | POSITION FAILURE |
| SEPARATION ROLLER | SEPARATE SHEET | WEAR OF ROLLER |
| BEARING | SUPPORT ROTARY SHAFT | WEAR |
| | ENERGIZE AXIAL LEAD | POOR GROUNDING |
| ... | ... | ... |

FIG. 12

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-071314 filed Apr. 10, 2020.

BACKGROUND

(i) Technical Field

The present disclosure relates to an information processing apparatus and a non-transitory computer readable medium.

(ii) Related Art

Japanese Unexamined Patent Application Publication No. 2018-132882 discloses a design support system capable of determining a relationship between a design element such as a component included in a product and a design requirement of the product when the product is designed.

SUMMARY

Aspects of non-limiting embodiments of the present disclosure relate to notifying, when, for example, a user designs a design element included in a product, the user of a trouble occurred in another design element whose design requirement is the same as that of the design element to be designed by the user so as to prevent a trouble from occurring due to the design element.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a memory and a processor. The memory is configured to store a trouble category into which a trouble that occurs in a product is classified and a design-element category into which a design element that causes the trouble and that is included in the product is classified in association with each other and store a design-element category into which a design element that is included in a product is classified and a design-requirement category into which a design requirement of the design element is classified in association with each other. The processor is configured to receive designation of a first design-element category by user, determine a design-requirement category that corresponds to the received first design-element category by referencing to the memory, determine a second design-element category that corresponds to the determined design-requirement category and that is different from the first design-element category, determine a trouble category that is associated with the determined second design-element category, and notify the user of information that indicates the determined trouble category.

BRIEF DESCRIPTION OF THE DRAWINGS

An exemplary embodiment of the present disclosure will be described in detail based on the following figures, wherein.

DETAILED DESCRIPTION

Exemplary Embodiment

Definitions of Terms

The term "design element" is a "generic term for members, components, devices, apparatuses, functional units, equipment, subsystems, systems, and so forth" or refers to any one of these.

The term "design requirement" refers to a "function of a design element that is considered to be required for providing a given service" or a "combination of such functions".

The term "failure" refers to a "fact that an item loses the ability to implement a required function". In the following description, a "failure" will also be referred to as a "trouble".

The term "failure mode" refers to each "category based on the type of failure states", and examples of which include disconnection, short circuit, breakage, wear, and characteristic deterioration. In the following description, a "failure mode" will also be referred to as a "state of a design element when the design element causes a trouble".

<Configuration of Information Processing System>

Figure 1:
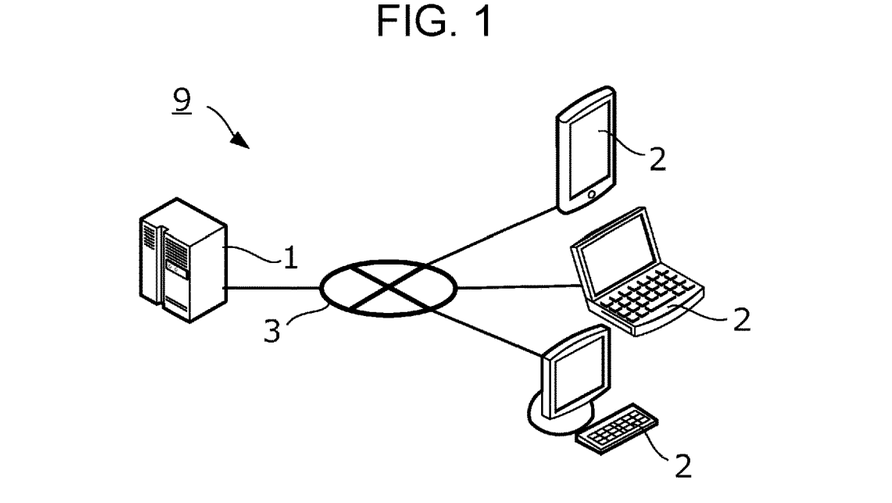
FIG. 1 is a diagram illustrating an example of an overall configuration of an information processing system.

FIG. 1 is a diagram illustrating an example of an overall configuration of an information processing system 9. The information processing system 9 illustrated in FIG. 1 is a system that notifies a user of a trouble that has occurred in a design element whose design requirement is the same as that of a specified design element. As illustrated in FIG. 1, the information processing system 9 includes an information processing apparatus 1, a terminal 2, and a communication line 3.

The terminal 2 is a terminal apparatus that is used by each user of the information processing system 9 and is, for example, a cellular phone such as a so-called smartphone or a personal computer such as a desktop personal computer, a laptop personal computer, or a tablet personal computer. The terminal 2 receives a user operation and gives an instruction to the information processing apparatus 1 in accordance with the user operation.

The information processing apparatus 1 is, for example, a computer and is a server apparatus that responds to a request from the terminal 2, which is a client apparatus.

The communication line 3 is a line connecting the information processing apparatus 1 and the terminal 2 such that the information processing apparatus 1 and the terminal 2 are capable of communicating with each other. The communication line 3 may be, for example, a local area network (LAN), a wide area network (WAN), or the Internet or may be a combination of these. The communication line 3 may also include the public switched telephone network (PSTN), the integrated services digital network (ISDN), or the like.

Note that, although FIG. 1 illustrates the single information processing apparatus 1, the single terminal 2, and the single communication line 3, the information processing system 9 may include a plurality of information processing apparatuses 1, a plurality of terminals 2, and a plurality of communication lines 3.

<Configuration of Information Processing Apparatus>

Figure 2:
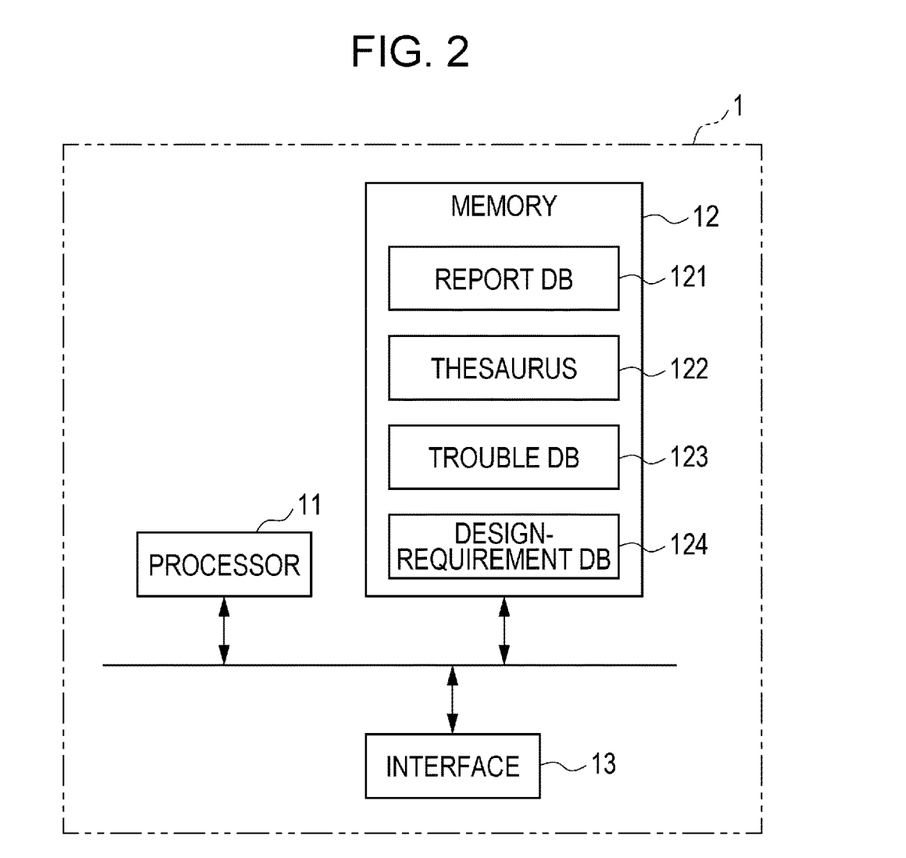
FIG. 2 is a diagram illustrating an example of a configuration of an information processing apparatus.

FIG. 2 is a diagram illustrating an example of the configuration of the information processing apparatus 1. The information processing apparatus 1 illustrated in FIG. 2 includes a processor 11, a memory 12, and an interface 13. These components are connected to one another via, for example, a bus such that they are capable of communicating with one another.

The processor 11 controls each unit of the information processing apparatus 1 by reading and running a computer program (hereinafter simply referred to as program) stored in the memory 12. The processor 11 is, for example, a central processing unit (CPU).

The interface 13 is a communication circuit connecting, in a wired or wireless manner, the information processing apparatus 1 to the terminal 2 via the communication line 3 such that the information processing apparatus 1 and the terminal 2 are capable of communicating with each other.

The memory 12 is a storage unit that stores an operating system that is read into the processor 11, various programs, data items, and so forth. The memory 12 includes a random access memory (RAM) and a read only memory (ROM). Note that the memory 12 may include a solid state drive, a hard disk drive, or the like.

The memory 12 illustrated in FIG. 2 also stores a report database (DB) 121, a thesaurus 122, a trouble database (DB) 123, and a design-requirement database (DB) 124.

Figure 3:
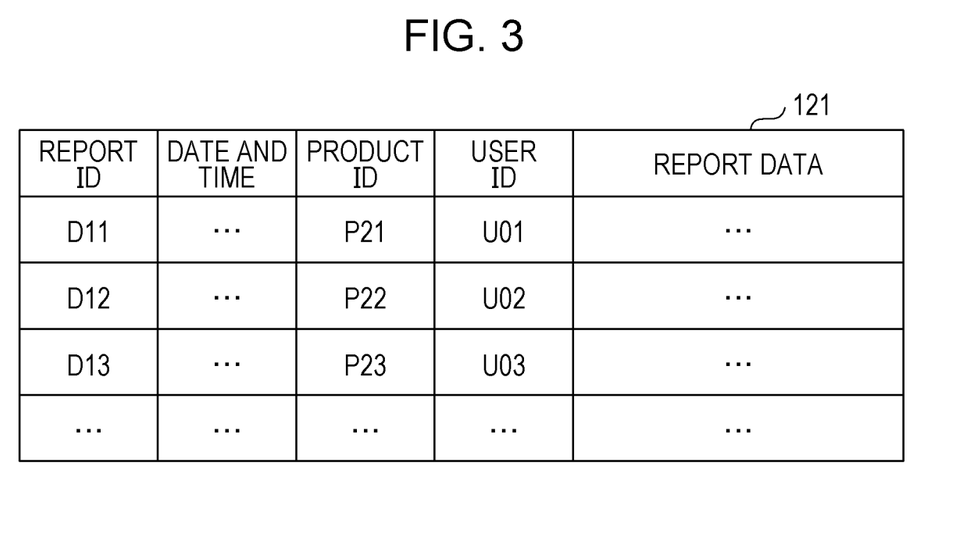
FIG. 3 is a table illustrating an example of a report DB.

FIG. 3 is a table illustrating an example of the report DB 121. The report DB 121 illustrated in FIG. 3 is a database in which information items regarding reports which are documents describing the details of troubles actually occurred in, for example, shipped products and products under test are stored and managed. In FIG. 3, a "report ID" field includes identification information items each of which identifies one of a plurality of reports. A "date and time" field includes data items each of which indicates the date and time of submission of the corresponding report, the date and time of occurrence of a trouble described in the report, or the like. A "product ID" field includes identification information items each of which identifies a product that had caused a trouble described in the corresponding report. A "user ID" field includes identification information items each of which identifies a user, which is a reporter who had sent the corresponding report to the information processing apparatus 1. A "report data" field includes electronic data of information items each of which indicates the title and the contents of the corresponding report. Each report data item may be a report itself. In the case where reports are in the form of electronic data, each report data item may include text data, drawing data, and image data that indicate the items and the contents described in the corresponding report. In the case where reports are created in the form of paper or the like, each report data item may include image data obtained by scanning the corresponding report paper or text data obtained by performing character recognition on the image data.

Figure 4:
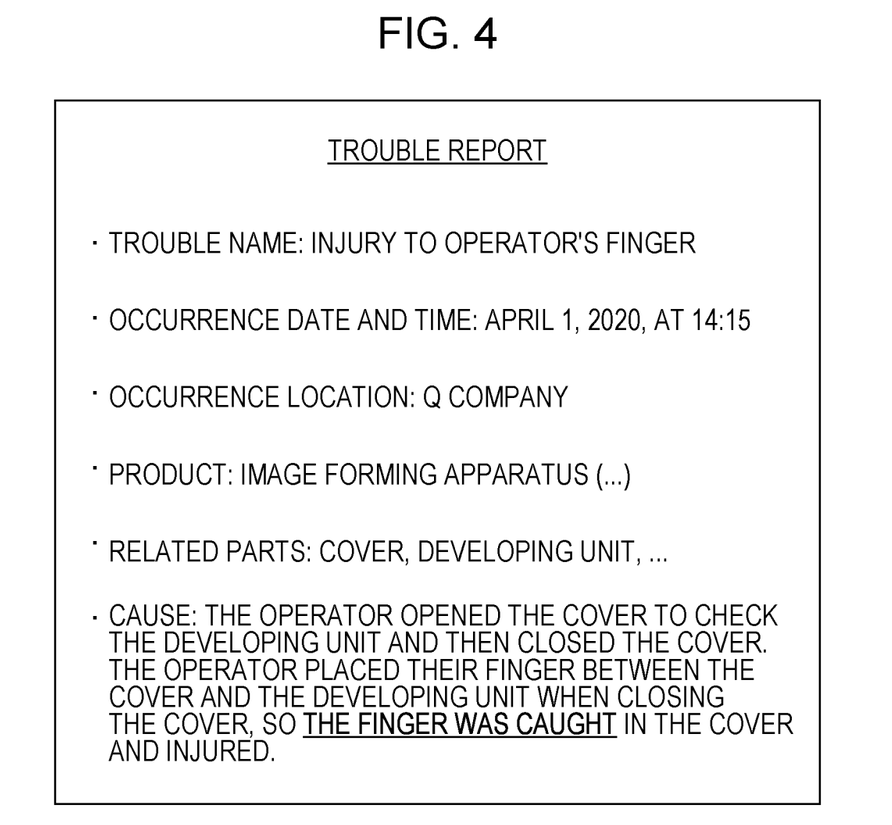
FIG. 4 is a diagram illustrating an example of a report.

FIG. 4 is a diagram illustrating an example of a report. The report illustrated in FIG. 4 is a document that describes information regarding a trouble and includes the title "trouble report" and the details of the trouble. The details of the trouble include, for example, the name of the trouble which is "injury to operator's finger", the date and time of occurrence of the trouble which is "Apr. 1, 2020, at 14:15", the parts related to the trouble (i.e., design elements) which are "a cover, a developing unit, and so forth". In addition, the report illustrated in FIG. 4 includes words, phrases, and sentences describing the location where the trouble had occurred, the product that had caused the trouble, the cause of the trouble, and so forth.

Figure 5:
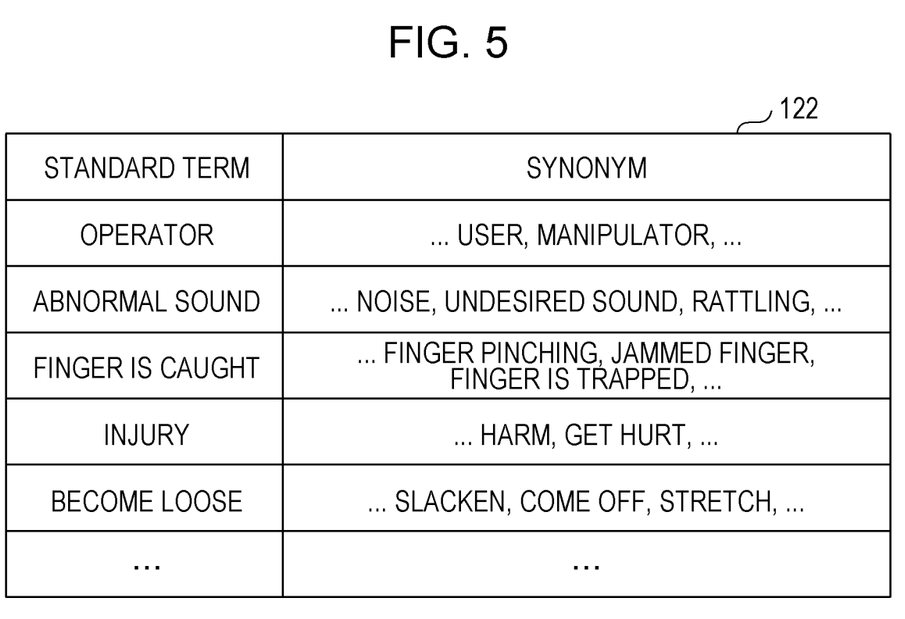
FIG. 5 is a table illustrating an example of a thesaurus.

FIG. 5 is a table illustrating an example of the thesaurus 122. The thesaurus 122 illustrated in FIG. 5 is a dictionary that associates a plurality of different words and phrases indicating the same state with each other.

Troubles occur in various products and occur in various locations. Such products are produced and sold by various establishments and designed by various designers, and various people are in charge of selling such products. Accordingly, there is a case where a trouble report is created by a plurality of reporters, and different words and phrases are used to indicate the same state, that is, there may sometimes be "variations of expressions".

The thesaurus 122 illustrated in FIG. 5 associates a standard term with one or more synonyms indicating a state the same as that indicated by the standard term. For example, it is understood from the thesaurus 122 illustrated in FIG. 5 that "noise", "undesired sound", "rattling", and the like are synonyms used by reporters to indicate the same state and that each of these is replaceable with a standard term "abnormal sound".

Figure 6:
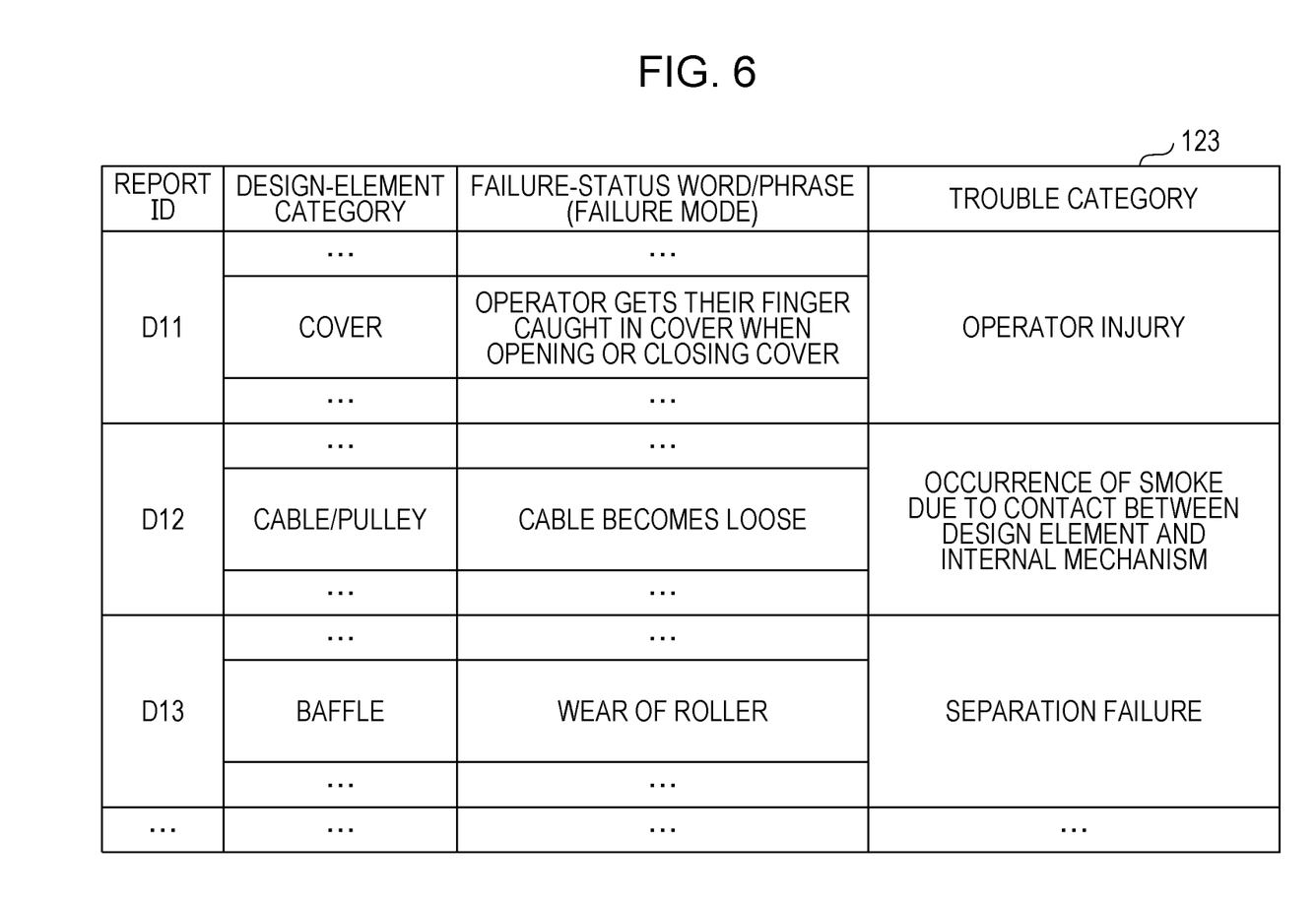
FIG. 6 is a table illustrating an example of a trouble DB.

FIG. 6 is a table illustrating an example of the trouble DB 123. The trouble DB 123 is a database storing trouble categories, into which troubles that occur in products are classified, and design-element categories, into which design elements that cause the troubles and that are included in the products are classified, in association with each other. The trouble DB 123 illustrated in FIG. 6 includes a "report ID" field, a "design-element category" field, a "failure-status word/phrase" field, and a "trouble category" field.

In FIG. 6, a report ID written in a report is entered in the "report ID" field. A category of one or more design elements that are the causes of a trouble described in a report, which is identified by its report ID, is entered in the "design-element category" field. In the "design-element category" field, components, members, and so forth having similar characteristics in terms of being a factor that causes a trouble are not individually entered but entered by being classified into a group.

In FIG. 6, a word or a phrase indicating a failure mode that is the state of a design element when the design element causes a trouble described in a report, which is identified by its report ID, is entered in the "failure-status word/phrase" field. A trouble category that is the name of a group into which a trouble described in a report identified by its report ID is classified is entered in the "trouble category" field.

For example, according to the trouble DB 123 illustrated in FIG. 6, information regarding a trouble that is described in a report identified by the report ID "D11" belongs to the trouble category "operator injury". In addition, the trouble DB 123 indicates that a "cover" is included in the design elements caused the above-mentioned trouble and that "an operator got their finger caught in the cover when opening or closing the cover" at the time of the occurrence of the trouble.

Figure 7:
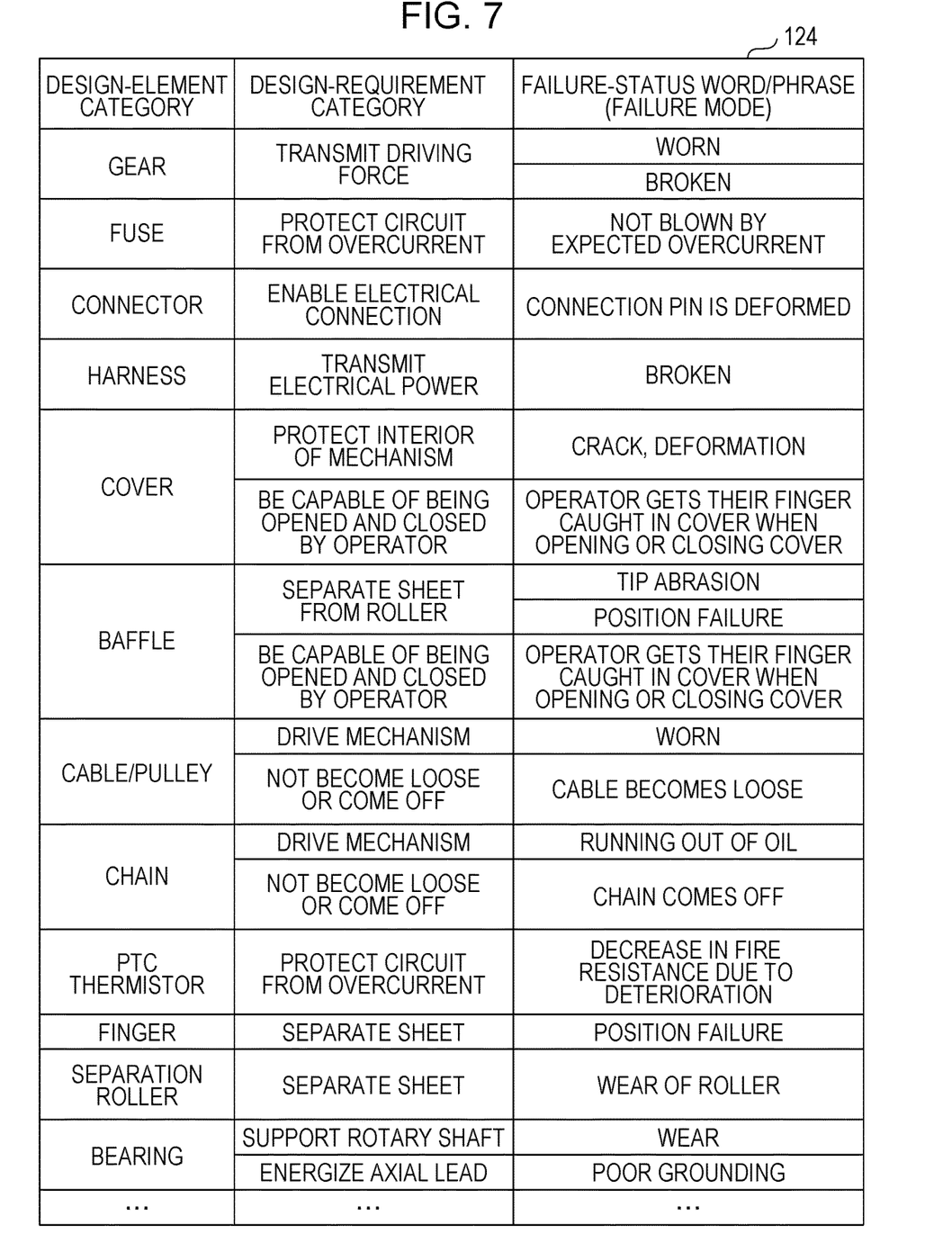
FIG. 7 is a table illustrating an example of a design-requirement DB.

FIG. 7 is a table illustrating an example of the design-requirement DB 124. The design-requirement DB 124 is a database storing design-element categories, into which design elements included in products are classified, and design-requirement categories, into which design requirements of the design elements are classified, in association with each other. The design-requirement DB 124 does not need to be created on the basis of troubles actually occurred in products, and for example, designers and experts who have knowledges of design may create the design-requirement DB 124 beforehand by using the design-element categories. The design-requirement DB 124 illustrated in FIG. 7 has a "design-element category" field, a "design-requirement category" field, and a "failure-status word/phrase" field.

In FIG. 7, various design-element categories are listed in the "design-element category" field. The names of groups into which design requirements of design elements are classified are entered in the "design-requirement category" field. A word or a phrase (hereinafter also referred to as failure-status word/phrase) that indicates the state of a design element when the design element loses an ability to achieve a design requirement that belongs to a corresponding design-requirement category is entered in the "failure-status word/phrase" field.

When a design element loses an ability to achieve its design requirement, the design element causes a trouble in a product that includes the design element. In other words, the memory 12 storing the design-requirement DB 124, which is illustrated in FIG. 7, is an example of a memory that stores words and phrases indicating the states of design elements included in products when the design elements cause troubles for each of the design-element categories into which the design elements are classified.

For example, in the design-requirement DB 124 illustrated in FIG. 7, a design requirement of the design-element category "gear" is set to belong to the design-requirement category "transmit driving force", and the words "worn" and "broken" are set as the state of the "gear" when the gear loses an ability to achieve the design requirement.

<Configuration of Terminal>

Figure 8:
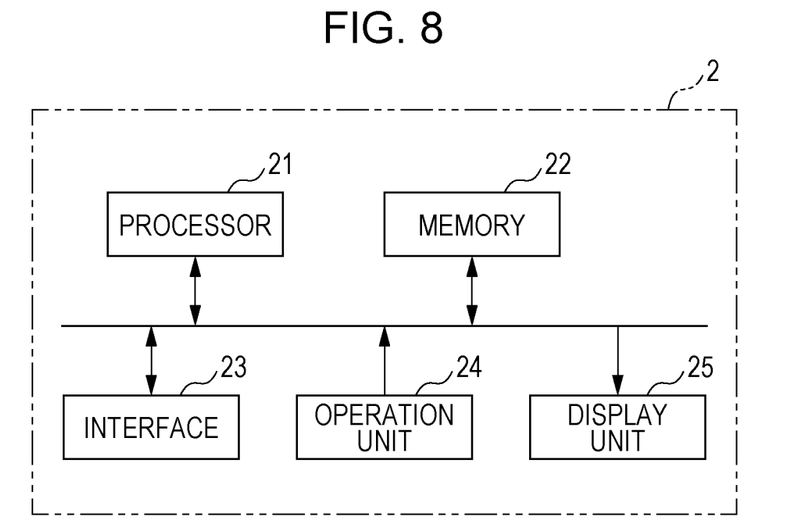
FIG. 8 is a diagram illustrating a configuration example of a terminal.

FIG. 8 is a diagram illustrating a configuration example of the terminal 2. The terminal 2 illustrated in FIG. 8 includes a processor 21, a memory 22, an interface 23, an operation unit 24, and a display unit 25. These components are connected to one another via, for example, a bus so as to be capable of communicating with one another.

The processor 21 controls each unit of the terminal 2 by reading and running a program stored in the memory 22. The processor 21 is, for example, a CPU.

The interface 23 is a communication circuit connecting, in a wired or wireless manner, the terminal 2 to the information processing apparatus 1 via the communication line 3 such that the terminal 2 and the information processing apparatus 1 are capable of communicating with each other.

The operation unit 24 includes operators such as an operation button, a keyboard, a touch panel, and a mouse that are used for issuing various instructions. The operation unit 24 receives an operation and transmits a signal according to the contents of the received operation to the processor 21.

The display unit 25 includes a screen such as a liquid crystal display and displays an image under control of the processor 21. A transparent touch panel of the operation unit 24 may be stacked on the screen.

The memory 22 is a storage unit that stores an operating system that is read into the processor 21, various programs, various programs, data items, and so forth. The memory 22 includes a RAM and a ROM. Note that the memory 22 may include a solid state drive, a hard disk drive, or the like.

<Functional Configuration of Information Processing Apparatus>

The processor 11 of the information processing apparatus 1 analyzes report data stored in the report DB 121 so as to implement a function of updating the trouble DB 123.

In addition, the processor 11 of the information processing apparatus 1 implements a function of notifying a user of information regarding a trouble category to which a trouble caused by a design element that belongs to a design-element category different from the design-element category specified by the user belongs.

<Report Analysis Function>

Figure 9:
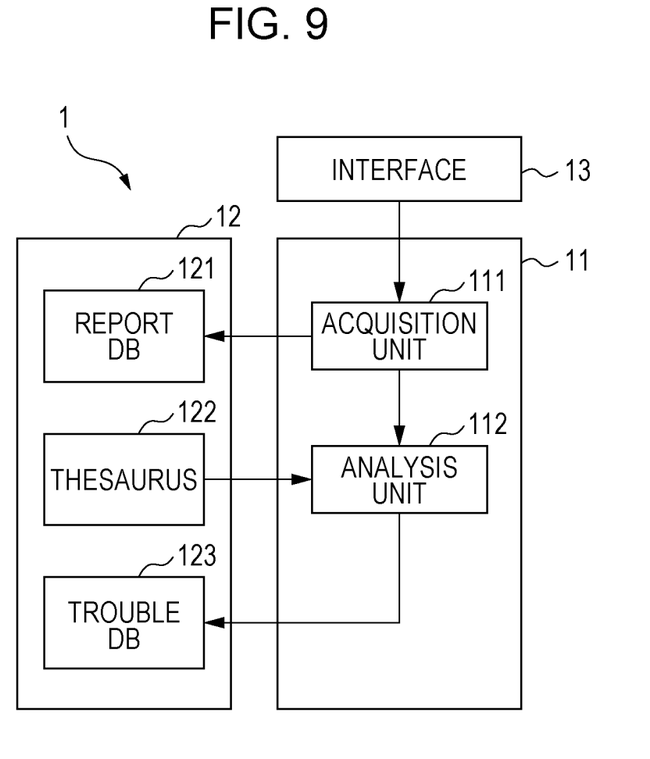
FIG. 9 is a diagram illustrating a functional configuration example of the information processing apparatus.

FIG. 9 is a diagram illustrating a functional configuration example of the information processing apparatus 1. The processor 11 of the information processing apparatus 1 illustrated in FIG. 9 functions as an acquisition unit 111 and an analysis unit 112 by running programs stored in the memory 12. As a result, the processor 11 implements a report analysis function.

The acquisition unit 111 acquires report data that indicates a report from the terminal 2 via the interface 13 and the communication line 3. Then, the acquisition unit 111 stores the acquired report data into the report DB 121 of the memory 12.

The analysis unit 112 reads the report DB 121 from the memory 12 and performs natural language analysis on each report data included in the report DB 121. The analysis unit 112 illustrated in FIG. 9 divides sentences that are included in a plurality of report data items in the report DB 121 into a plurality of words and phrases by performing, for example, morphological analysis that is an example of natural language analysis on the sentences. Then, the analysis unit 112 illustrated in FIG. 9 extracts, from the plurality of words and phrases, a pair of words or phrases that indicate the trouble category to which a reported trouble belongs and the design-element category into which a design element that caused the trouble in a product is classified.

In other words, the processor 11 that functions as the analysis unit 112 is an example of a processor that extracts a pair of a trouble category and a design-element category, into which a design element caused a trouble that belongs to the trouble category is classified, from a report by performing natural language analysis.

In addition, the analysis unit 112 illustrated in FIG. 9 extracts, from a plurality of words and phrases that are obtained by dividing sentences included in a plurality of report data items, a word or a phrase indicating the design-element category into which the design element caused the above-mentioned trouble is classified and also a word or a phrase indicating the state of the design element at the time of occurrence of the trouble due to the design element, that is, a failure-status word/phrase.

In other words, the processor 11 that functions as the analysis unit 112 is an example of a processor that extracts a pair of a word or a phrase indicating a design-element category into which a design element is classified and a word or a phrase indicating the state of the design element at the time of occurrence of a trouble due to the design element from a report by performing natural language analysis.

The analysis unit 112 performs natural language analysis on a plurality of report data items so as to extract the above-mentioned pair of a trouble category and a design-element category or so as to extract the above-mentioned pair of a design-element category and a failure-status word/phrase and updates the trouble DB 123.

Note that, as illustrated in FIG. 9, the analysis unit 112 may accommodate variations of expressions in report data items, which are included in the report DB 121, by referencing to the thesaurus 122. In other words, the analysis unit 112 may perform normalization using the thesaurus 122 on report data items that indicate reports acquired by the acquisition unit 111 and then may update the trouble DB 123. Here, the term "normalization" refers to replacing words and phrases included in a target sentence that are defined as synonyms by the thesaurus 122 with a standard term that is associated with the synonyms. As a result, for example, a design element that is in a state indicated by a synonym (also called "second word/phrase") in the report DB 121 is stored in the trouble DB 123 as being in a state indicated by a corresponding standard term (also called "first word/phrase").

<Information Notification Function>

Figure 10:
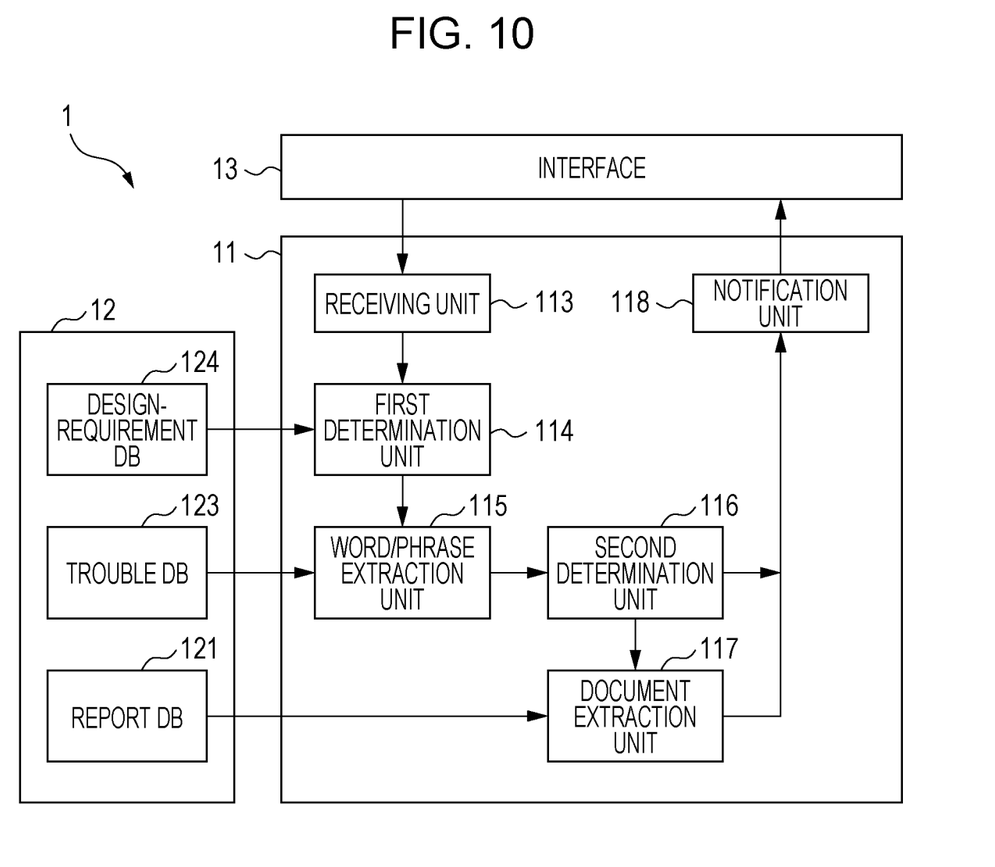
FIG. 10 is a diagram illustrating another functional configuration example of the information processing apparatus.

FIG. 10 is a diagram illustrating another functional configuration example of the information processing apparatus 1. The processor 11 of the information processing apparatus 1 illustrated in FIG. 10 functions as a receiving unit 113, a first determination unit 114, a word/phrase extraction unit 115, a second determination unit 116, a document extraction unit 117, and a notification unit 118 by running programs stored in the memory 12. As a result, the processor 11 implements an information notification function.

The receiving unit 113 receives designation of a design-element category (hereinafter also referred to as first design-element category) by a user from the terminal 2 via the communication line 3 and the interface 13. The first design-element category is, for example, a design-element category to which a design element that the user plans to design belongs. In other words, the processor 11 that functions as the receiving unit 113 is an example of a processor that receives designation of the first design-element category by a user.

The first determination unit 114 determines, by referencing to the design-requirement DB 124 stored in the memory 12, a design-requirement category that corresponds to the first design-element category indicated by the designation received by the receiving unit 113. Then, the first determination unit 114 determines a design-element category (hereinafter referred to as second design-element category) that is different from the first design-element category and that is associated with a design-requirement category having a predetermined relationship with the determined design-requirement category. Here, the phrase "having a predetermined relationship" refers to being identical or similar to each other. The first design-element category and the second design-element category correspond to each other as a result of having the predetermined relationship.

In other words, the first determination unit 114 determines the second design-element category whose design-requirement category is in the correspondence relationship with the design-requirement category of the first design-element category by the user. That is to say, the processor 11 that functions as the first determination unit 114 is an example of a processor that determines, by referencing to the memory, a design-requirement category corresponding the received first design-element category and determines the second design-element category that corresponds to the determined design-requirement category and that is different from first design-element category.

The word/phrase extraction unit 115 retrieves a design element that belongs to the first design-element category indicated by designation received by the receiving unit 113 by referencing to the trouble DB 123 stored in the memory 12 and extracts a failure-status word/phrase that corresponds to the retrieved design element. This failure-status word/phrase indicates the state of the design element, which belongs to the first design-element category, at the time of occurrence of a trouble due to the design element. In other words, the processor 11 that functions as the word/phrase extraction unit 115 is an example of a processor that extracts, by referencing to the memory, the first word/phrase indicating the state of a design element at the time of occurrence of a trouble due to the design element, the design element belonging to the received first design-element category. The word/phrase extraction unit 115 notifies the second determination unit 116 of the extracted first word/phrase.

Note that the trouble DB 123 illustrated in FIG. 10 is updated by the analysis unit 112 illustrated in FIG. 9. Thus, as a result of the analysis unit 112 performing natural language analysis, the trouble DB 123 includes a pair of a trouble category and a design-element category into which a design element caused a trouble that belongs to the trouble category is classified, the pair of categories being extracted from a report.

The word/phrase extraction unit 115 illustrated in FIG. 10 extracts, from the trouble DB 123 that includes a pair of categories extracted by the analysis unit 112, the first word/phrase that indicates the state of a design element when the design element causes a trouble, the design element belonging to the first design-element category. In other words, the processor 11 that functions as the word/phrase extraction unit 115 is an example of a processor that extracts, from a pair of categories extracted by the analysis unit 112, the first word/phrase that indicates the state of a design element when the design element causes a trouble, the design element belonging to the received first design-element category.

The second determination unit 116 determines, by referencing to the trouble DB 123 stored in the memory 12, a trouble category that is associated with the second design-element category determined by the first determination unit 114. In other words, the processor 11 that functions as the second determination unit 116 is an example of a processor that determines a trouble category associated with the determined second design-element category.

Note that, as mentioned above, the trouble DB 123 illustrated in FIG. 10 is updated by the analysis unit 112 illustrated in FIG. 9. Thus, the processor 11 that functions as the second determination unit 116 is an example of a processor that determines, from a pair of categories extracted by the analysis unit 112, a trouble category associated with the second design-element category.

In addition, the second determination unit 116 illustrated in FIG. 10 narrows down the second design-element categories, which are determined by the first determination unit 114, by using the first word/phrase extracted by the word/phrase extraction unit 115. In other words, the second determination unit 116 extracts, from the second design-element categories determined by the first determination unit 114, the second design-element category to which a design element that is in a state (i.e., failure mode) indicated by the obtained first word/phrase belongs. Then, the second determination unit 116 determines a trouble category into which a trouble that occurs when the design element, which belongs to the extracted second design-element category, is in the above-mentioned state is classified.

In other words, the processor 11 that functions as the second determination unit 116 is an example of a processor that determines, from trouble categories associated with the second design-element category, a trouble category into which a trouble that occurs when a design element belonging to the second design-element category is in a state indicated by the extracted first word/phrase is classified.

In addition, as described above, in the case where the analysis unit 112 performs normalization using the thesaurus 122 and then updates the trouble DB 123 illustrated in FIG. 10, the second determination unit 116 illustrated in FIG. 10 determines a trouble category into which a trouble that occurs when a design element belonging to the second design-element category is in a state indicated by a synonym which is associated with a standard term in the thesaurus 122 is classified.

In other words, the processor 11 that functions as the second determination unit 116 is an example of a processor that determines, from trouble categories associated with the second design-element category, a trouble category into which a trouble that occurs when a design element belonging to the second design-element category is in a state indicated by the second word/phrase which is associated with the first word/phrase in the thesaurus is classified.

The document extraction unit 117 extracts, from the report DB 121 stored in the memory 12, report data that indicates a report describing the details of a trouble that belongs to a trouble category determined by the second determination unit 116. In other words, the processor 11 that functions as the document extraction unit 117 is an example of a processor that extracts a document in which details of a trouble that belongs to the determined trouble category are written from the memory.

The notification unit 118 notifies a user of information that indicates a trouble category determined by the second determination unit 116. The information indicating a trouble category is, for example, character string data or the like that indicates a trouble category such as "operator injury" illustrated in FIG. 6. In other words, the processor 11 that functions as the notification unit 118 is an example of a processor that notifies a user of information indicating the determined trouble category. As a result, the terminal 2 is notified of a trouble category into which a trouble that had caused in the past by a design element whose design requirement is the same as or similar to that of a design element that a user tries to design is classified.

In addition, the notification unit 118 may issue a notification of report data that is extracted by the document extraction unit 117 and that is data indicating a document in which details of a trouble which belongs to a trouble category determined by the second determination unit 116 are written. In other words, the notification unit 118 may issue a notification of a report itself. In other words, the processor 11 that functions as the notification unit 118 is an example of a processor that notifies a user of a report describing details of a trouble that belongs to the determined trouble category.

<Operation of Information Processing Apparatus>
<Operation of Analyzing Report>

Figure 11:
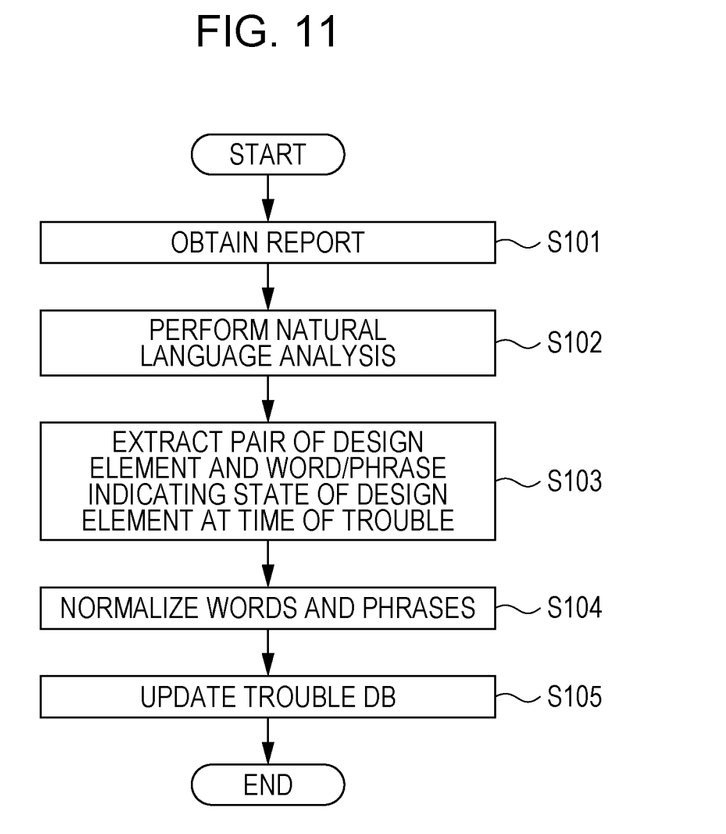
FIG. 11 is a flowchart illustrating an example of the flow of an operation of a processor when the processor analyzes a report.

FIG. 11 is a flowchart illustrating an example of the flow of an operation of the processor 11 when the processor 11 analyzes a report. The processor 11 of the information processing apparatus 1 obtains a report that is created by a user, who is a reporter, from the terminal 2 via the interface 13 and the communication line 3 (step S101).

The processor 11 stores the obtained report into the report DB 121 of the memory 12. In addition, the processor 11 performs natural language analysis on the reports stored in the report DB 121 (step S102).

The processor 11 extracts a pair of a design-element category into which a design element is classified and a word or a phrase that indicates the state of the design element when the design element causes a trouble (i.e., at the time of occurrence of a trouble) on the basis of results of the natural language analysis (step S103).

The processor 11 refers to the thesaurus 122 and normalizes words and phrases that are included in the extracted pair (step S104). Then, the processor 11 updates the trouble DB 123 by adding obtained words and phrases to the trouble DB 123 (step S105).

<Operation of Notifying Information>

Figure 12:
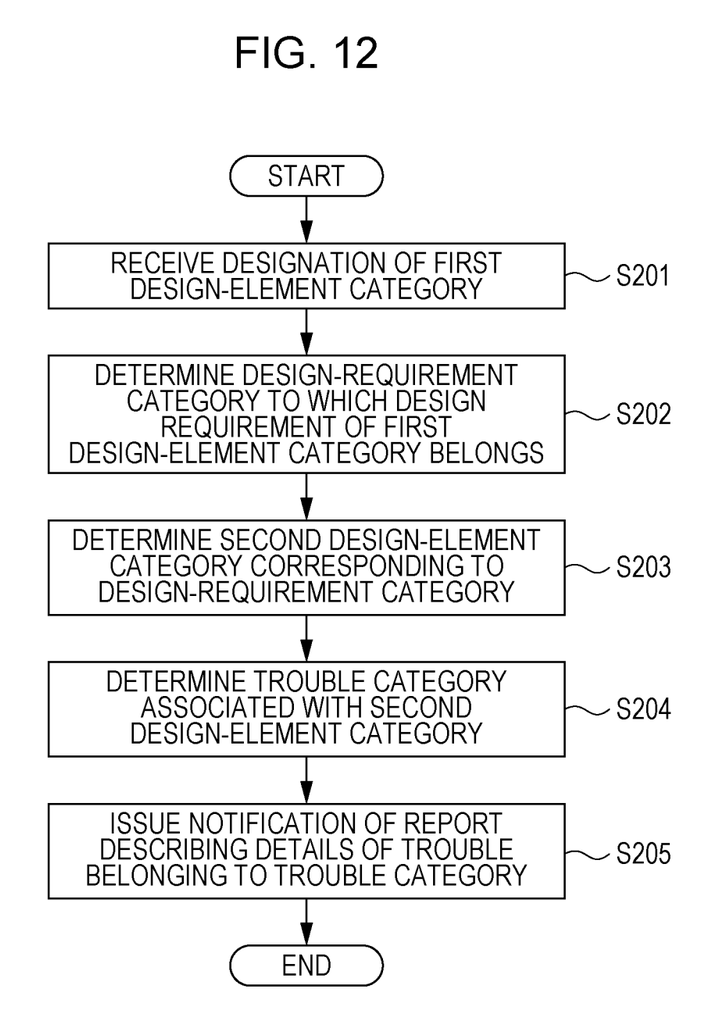
FIG. 12 is a flowchart illustrating an example of the flow of an operation of a processor when the processor issues a notification of information.

FIG. 12 is a flowchart illustrating an example of the flow of an operation of the processor 11 when the processor 11 issues a notification of information. The processor 11 of the information processing apparatus 1 receives designation of the first design-element category by a user from the terminal 2 via the interface 13 and the communication line 3 (step S201).

The processor 11 determines a design-requirement category to which a design requirement of a design element that belongs to the received first design-element category belongs by referencing to the design-requirement DB 124 (step S202). Then, the processor 11 determines the second design-element category that corresponds to the determined design-requirement category (S203).

The processor 11 determines a trouble category that is associated with the determined second design-element category by referencing to the trouble DB 123 (step S204). Then, the processor 11 notifies the terminal 2 of a report describing details of a trouble that belongs to the trouble category (step S205). As a result, the user of the terminal 2 is notified of the report describing the details of the above-mentioned trouble as information indicating the determined trouble category.

<Case 1>

In the case where a trouble in that an operator gets their finger caught in a cover of a printer and is injured when opening or closing the cover occurs, a report that is illustrated in FIG. 4 is created. The information processing apparatus 1 obtains and analyzes electronic data of this report and determines the design-element category "cover" into which a design element that had caused the trouble is classified. In the design-requirement DB 124, the design-requirement categories "protect interior of mechanism" and "be capable of being opened and closed by operator" are stored beforehand in association with the design-element category "cover".

Next, when a designer tries to design a design element that belongs to the design-element category "baffle" and that is different from the cover, and designate the design element by using the terminal 2, the information processing apparatus 1 determines the design-requirement categories "separate sheet from roller" and "be capable of being opened and closed by operator" that are associated with the design-element category "baffle" in the design-requirement DB 124.

Subsequently, the information processing apparatus 1 determines the second design-element category "cover" whose design-requirement category is "be capable of being opened and closed by operator", which is the same as that of the designated first design-element category "baffle". Then, the information processing apparatus 1 determines a trouble category to which a trouble caused by the "cover" belongs from the trouble DB 123 and notifies the above-mentioned designer of information regarding this trouble category.

<Case 2>

Assume the case in which a finger (a small-piece member) is disposed close to a roller, which transports a sheet as a result of the sheet being wrapped around the roller, so as to separate the sheet from the roller and in which the position of the finger deviates from its design position, so that a trouble called a separation failure occurs. In addition, assume another case in which a separation roller that separates the sheet from the roller by coming into contact with the roller becomes worn, so that another trouble called a separation failure occurs. Subsequently, reports of these troubles are created.

In the design-requirement DB 124, the design-requirement category "separate sheet" of the design-element categories "finger" and "separation roller" is similar to the design-requirement category "separate sheet from roller" of the design-element category "baffle".

In addition, in the design-requirement DB 124, the failure-status word/phrase "position failure" of the design-element category "finger" is the same as the failure-status word/phrase "position failure" the design-element category "baffle".

However, in the design-requirement DB 124, the failure-status word/phrase "wear of roller" of the design-element category "separation roller" and the failure-status word/phrase "position failure" of the design-element category "baffle" are neither the same as nor similar to each other.

Thus, the information processing apparatus 1 determines the second design-element category "finger" whose design-requirement category is similar to that of the designated first design-element category "baffle" and whose failure-status word/phrase is the same as that of the designated first design-element category "baffle" and does not determine the design-element category "separation roller". In other words, the information processing apparatus 1 compares the failure-status words/phrases as well as the design-requirement categories, so that the design-element category "separation roller" is excluded from the candidates for the second design-element category that corresponds to the first design-element category "baffle".

For example, when a user tries to design a design element that is included in a product and designates the first design-element category to which the design element belongs, the information processing system 9 notifies, by performing the above-described operation, the user of a trouble caused by another design element (belonging to the second design-element category) whose design requirement is the same as that of the design element belonging to the first design-element category. As a result, before the user designs the design element, the user is notified of the trouble caused by the other design element whose design requirement is the same as that of the design element that the user tries to design.

Modifications

Although the exemplary embodiment has been described above, the exemplary embodiment may be modified as described below. In addition, the following modifications may be combined.

<1>

In the above-described exemplary embodiment, although the information processing system 9 is a so-called client server system connecting the information processing apparatus 1 and the terminal 2 to each other, a single apparatus may have client and server functions. In this case, for example, the information processing apparatus 1 may include components that correspond to the operation unit 24 and the display unit 25 and may implement a function that is implemented by the terminal 2.

<2>

In the above-described exemplary embodiment, although the information processing apparatus 1 includes the processor 11, which includes the CPU, another component may serve as the control unit that controls the information processing apparatus 1. For example, the information processing apparatus 1 may include various processors other than the CPU.

Here, the term "processor" refers to hardware in a broad sense. Examples of the processor include general processors (e.g., the above-mentioned CPU) and dedicated processors (e.g., GPU: Graphics Processing Unit, ASIC: Application Specific Integrated Circuit, FPGA: Field Programmable Gate Array, and programmable logic device).

<3>

In the exemplary embodiment above, the term "processor" is broad enough to encompass one processor or plural processors in collaboration which are located physically apart from each other but may work cooperatively.

The order of operations of the processor is not limited to one described in the exemplary embodiment above, and may be changed.

In addition, the processor 21 may provide some of the functions implemented by the processor 11 in the above-described exemplary embodiment.

In this case, the information processing system 9 is an example of an information processing system that includes the information processing apparatus 1 and the terminal 2, and in the information processing system, the memory 12 of the information processing apparatus 1 or the memory 22 of the terminal 2 stores a trouble category into which a trouble occurred in a product is classified and a design element that causes the trouble and that is included in the product are stored in association with each other and stores a design-element category into which a design element included in the product is classified and a design-requirement category into which a design requirement of the design element is classified are stored in association with each other. The processor 11 of the information processing apparatus 1 or the processor 21 of the terminal 2 receives designation of the first design-element category by a user, determines a design-requirement category that corresponds to the received first design-element category by referencing to the corresponding memory, determines a second design-element category that corresponds to the determined design-requirement category and that is different from the first design-element category, determines a trouble category that is associated with the determined second design-element category, and notifies the user of information that indicates the determined trouble category.

<4>

In the above-described exemplary embodiment, although the processor 11 of the information processing apparatus 1 implements the report analysis function, it is not necessary for the processor 11 to implement the report analysis function. In this case, the information processing apparatus 1 may obtain the trouble DB 123 or may store the trouble DB 123 into the memory 12. In addition, in this case, the information processing apparatus 1 does not need to obtain a report and does not need to store the report DB 121. In this case, the information processing apparatus 1 issues a notification of, for example, the name of a trouble category instead of a corresponding report as information indicating the determined trouble category.

The information processing apparatus 1 may store data that has undergone processing such as summarization or editing based on the contents of a report instead of report data that directly indicates the contents of the report into the report DB 121. In this case, the information processing apparatus 1 issues a notification of the details of the trouble that is extracted from the processed report and that is indicated by the trouble category instead of the corresponding report as information indicating the determined trouble category.

<5>

In the above-described exemplary embodiment, although the memory 12 of the information processing apparatus 1 stores the thesaurus 122, the memory 12 does not need to store the thesaurus 122. In this case, the processor 11 does not perform the above-mentioned normalization.

<6>

In the above-described exemplary embodiment, although the processor 11 of the information processing apparatus 1 narrows down the second design-element categories by using the extracted first word/phrase, the processor 11 does not need to narrow down the second design-element categories. In this case, the processor 11 does not need to extract the first word/phrase.

<7>

A program that is executed by the processor 11 of the above-described information processing apparatus 1 is an example of a program that causes a computer including a memory configured to store a trouble category into which a trouble that occurs in a product is classified and a design-element category into which a design element that causes the trouble and that is included in the product is classified in association with each other and store a design-element category into which a design element that is included in a product is classified and a design-requirement category into which a design requirement of the design element is classified in association with each other, and a processor to execute a process, the process including receiving designation of a first design-element category by a user, determining a design-requirement category that corresponds to the received first design-element category by referencing to the memory, determining a second design-element category that corresponds to the determined design-requirement category and that is different from the first design-element category, determining a trouble category that is associated with the determined second design-element category, and notifying the user of information that indicates the determined trouble category.

The program may be provided by being stored in computer-readable recording medium such as a magnetic recording medium (e.g., a magnetic tape or a magnetic disk), an optical recording medium (e.g., an optical disc), a magneto-optical recording medium, or a semiconductor memory. Alternatively, the program may be downloaded via a communication line such as the Internet.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a memory; and
a processor,
wherein the memory is configured to
store a trouble database in which a trouble that occurs in a product is classified into trouble categories and each trouble category is associated with a design-element category into which a design element that causes the trouble and that is included in the product is classified, and
store a design-requirement database, which is separate from the trouble database, in which the design element in the product is classified into design-element categories and each design-element category is associated with a design-requirement category into which a design requirement of the design element is classified, and
wherein the processor is configured to:
receive, from a user, designation of a first design-element category to be added to the product,
determine a design-requirement category that corresponds to the received first design-element category by referencing the design-requirement database in the memory,
determine a second design-element category that corresponds to the determined design-requirement category and that is different from the first design-element category,
determine a trouble category that is associated with the determined second design-element category, and
notify the user of information that indicates the determined trouble category.

2. The information processing apparatus according to claim 1,
wherein the memory stores report data in which a detail of the trouble is written, and
wherein the processor is configured to extract the report data in which the detail of the trouble that belongs to the determined trouble category is written from the memory and notify the user of the report data.

3. The information processing apparatus according to claim 1,
wherein the memory stores, in the design-requirement database, words and phrases that indicate failure states of design elements included in the product when the design elements cause troubles, for each of the design-element categories, and
wherein the processor is configured to
extract, by referencing the design-requirement database in the memory, a first word or phrase indicating a failure state of a design element that belongs to the received first design-element category, and determine, from trouble categories that are associated with the second design-element category, a trouble category into which a trouble that occurs when a design element that belongs to the second design-element category is in a failure state indicated by the extracted first word or phrase is classified.

4. The information processing apparatus according to claim 2, wherein the memory stores, in the design-requirement database, words and phrases that indicate failure states of design elements included in the product when the design elements cause troubles, for each of the design-element categories, and wherein the processor is configured to extract, by referencing the design-requirement database in the memory, a first word or phrase indicating a failure state of a design element that belongs to the received first design-element category, and determine, from trouble categories that are associated with the second design-element category, a trouble category into which a trouble that occurs when a design element that belongs to the second design-element category is in a failure state indicated by the extracted first word or phrase is classified.

5. The information processing apparatus according to claim 2, wherein the processor is configured to extract, by performing natural language analysis on the report data, a pair of (i) a trouble category and (ii) a design-element category into which a design element that causes the trouble belonging to the trouble category is classified, and determine a trouble category that is associated with the second design-element category from the extracted pair.

6. The information processing apparatus according to claim 1, wherein the memory stores report data in which a detail of the trouble is written, and wherein the processor is configured to extract, by performing natural language analysis on the report data, a pair of (i) a design-element category into which a design element is classified and (ii) a word or a phrase that indicates a failure state of the design element when the design element causes the trouble, extract a first word or phrase indicating a failure state of a design element that belongs to the received first design-element category when the design element causes the trouble, from the extracted pair, and determine, from trouble categories that are associated with the second design-element category, a trouble category into which a trouble that occurs when a design element that belongs to the second design-element category is in a failure state indicated by the extracted first word or phrase is classified.

7. The information processing apparatus according to claim 6, wherein the memory stores a dictionary that associates a plurality of different words and phrases indicating the same state with each other, and wherein the processor is configured to determine, from trouble categories that are associated with the second design-element category, a trouble category into which a trouble that occurs when a design element belonging to the second design-element category is in a failure state indicated by a second word or phrase that is associated with the first word or phrase in the dictionary is classified.

8. A non-transitory computer readable medium storing a program causing a computer including a memory configured to store a trouble database in which a trouble that occurs in a product is classified into trouble categories and each trouble category is associated with a design-element category into which a design element that causes the trouble and that is included in the product is classified, and store a design-requirement database, which is separate from the trouble database, in which the design element in the product is classified into design-element categories and each design-element category is associated with a design-requirement category into which a design requirement of the design element is classified, and a processor to execute a process, the process comprising:

receiving, from a user, designation of a first design-element category to be added to the product;

determining a design-requirement category that corresponds to the received first design-element category by referencing the design-requirement database in the memory;

determining a second design-element category that corresponds to the determined design-requirement category and that is different from the first design-element category;

determining a trouble category that is associated with the determined second design-element category; and notifying the user of information that indicates the determined trouble category.

9. An information processing apparatus comprising:

means for storing a trouble database in which a trouble that occurs in a product is classified into trouble categories and each trouble category is associated with a design-element category into which a design element that causes the trouble and that is included in the product is classified, and for storing a design-requirement database, which is separate from the trouble database, in which the design element in the product is classified into design-element categories and each design-element category is associated with a design-requirement category into which a design requirement of the design element is classified;

means for receiving, from a user, designation of a first design-element category to be added to the product;

means for determining a design-requirement category that corresponds to the received first design-element category by referencing the design-requirement database in the memory;

means for determining a second design-element category that corresponds to the determined design-requirement category and that is different from the first design-element category;

means for determining a trouble category that is associated with the determined second design-element category; and means for notifying the user of information that indicates the determined trouble category.

* * * * *